(12) United States Patent
Monnier

(10) Patent No.: US 8,794,668 B2
(45) Date of Patent: Aug. 5, 2014

(54) STORAGE DEVICE HAVING A FRONT PORTION AND A REAR PORTION SEPARABLE UNDER THE EFFECT OF A FORCE

(75) Inventor: Gwenael Monnier, Mareil sur Mauldre (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/534,562

(22) Filed: Jun. 27, 2012

(65) Prior Publication Data

US 2013/0161977 A1  Jun. 27, 2013

(30) Foreign Application Priority Data

Jun. 27, 2011 (FR) .................................. 11 01991

(51) Int. Cl.
*B60R 21/045* (2006.01)
*B60R 7/06* (2006.01)
(52) U.S. Cl.
USPC ........................................ 280/752; 296/37.12
(58) Field of Classification Search
USPC ................. 280/751, 752; 296/187.05, 72, 70, 296/37.12
See application file for complete search history.

(56) References Cited

U.S. PATENT DOCUMENTS

| 5,431,442 A * | 7/1995 | Tomita et al. ................. 280/752 |
| 7,311,327 B2 * | 12/2007 | Yamazaki ..................... 280/752 |
| 7,735,866 B2 * | 6/2010 | Clashman et al. ............ 280/752 |
| 8,251,399 B2 * | 8/2012 | Babian .......................... 280/752 |
| 2004/0124623 A1 | 7/2004 | Yamazaki |

FOREIGN PATENT DOCUMENTS

| DE | 102006051948 | 6/2008 |
| JP | 2003104130 | 4/2003 |

OTHER PUBLICATIONS

French Search Report for FR 1101991 dated Jan. 19, 2012, 2 pages.
Opinion for FR 1101991 dated Jun. 27, 2011, 4 pages (in French only).

* cited by examiner

*Primary Examiner* — Drew Brown
(74) *Attorney, Agent, or Firm* — Reising Ethington P.C.

(57) ABSTRACT

A storage device (6) having at least one front portion (14) and one rear portion (12) defining together a storage space (8). The front portion (14) and the rear portion (12) are attached to each other by a separable attachment device (16). The attachment device (16) is laid out so as to allow separation of said front portion (14) from the rear portion (12) under the effect of an external force greater than a predetermined threshold, so that the front portion (14) or the rear portion (12) is detached from the other portion and penetrates into the storage space (8) under the effect of said external force.

14 Claims, 2 Drawing Sheets

STORAGE DEVICE HAVING A FRONT PORTION AND A REAR PORTION SEPARABLE UNDER THE EFFECT OF A FORCE

TECHNICAL FIELD

The present invention relates to a storage device for a vehicle having at least one front portion and one rear portion defining together a storage space. The present invention also relates to a vehicle dashboard having such a storage device. The invention more particularly applies to storage devices for a motor vehicle of the glove box type provided in the dashboard of a motor vehicle.

BACKGROUND

Such a storage device is laid out in the dashboard so as to make the storage space accessible through the frontage of the dashboard, while the bottom of the storage device extends facing structural elements of the vehicle concealed by the dashboard, such as a portion of the heating, ventilation and air conditioning unit or else the fire wall which separates the inner passenger compartment of the vehicle and the engine compartment. In the case of a glove box, the storage device is for example positioned facing the knees of the front passenger of the motor vehicle.

In the case of a front impact against the motor vehicle, these structural elements may move towards the rear of the motor vehicle, i.e. towards the passenger compartment. This displacement causes intrusion of the frontage of the storage device into the passenger compartment of the motor vehicle, under the effect of the thrust from the structural elements positioned facing the bottom of the device, this intrusion may cause injuries to the front passenger of the vehicle by hitting his/her knees.

The space extending between the bottom of the storage device and the structural elements is insufficient for providing means for absorbing the energy due to the impact allowing limitation of the risks of injuries to the passenger of the motor vehicle. This space between the bottom of the device and the structural elements is all the more small since it is always sought to enlarge the available storage space.

Therefore, provision was made for the storage device itself to be capable of absorbing the energy due to the impact or for it to be laid out in order to limit its intrusion into the passenger compartment in the case of an impact. For this purpose, the storage device is for example laid out so as to deform by being crushed in the case of an impact causing a force to be applied on the bottom of the device by the structural elements extending facing this bottom. Document FR-2 924 078 for example describes such a deformable storage device. Crushing of the storage device has the effect of absorbing energy and of limiting the displacement of the storage device towards the passenger compartment.

However, the making of such a deformable storage device in the case of an impact is complex and costly. Further, deformation of the device may not be sufficient for ensuring satisfactory energy absorption and optimally limiting the risks of injuries to the occupant of the vehicle. Finally, it happens that the deformation is not immediate and not sufficiently rapid in the case of a violent impact, the storage device forming in this case a hard point at the moment of the impact with the occupant, before being subsequently deformed by absorbing the energy.

SUMMARY

One of the objects of the invention is to overcome the drawbacks above by proposing a simple-to-make storage device and allowing limitation of the risks of intrusion into the passenger compartment of the vehicle, and therefore of injuries to the passenger, in the case of an impact, in a satisfactory way.

For this purpose, the invention relates to a storage device of the aforementioned type, wherein the front portion and the rear portion are attached to each other by a separable attachment device, said attachment device being arranged so as to allow separation of said front portion from said rear portion under the effect of an external force above a predetermined threshold, so that the front portion or the rear portion is detached from the other portion and penetrates into the storage space under the effect of said external force.

Absorption of energy and limitation of the intrusion into the passenger compartment of the vehicle is accomplished by displacing a portion of the device relatively to the other portion, after detachment of these portions, and penetration of this portion into the storage space. The storage space actually provides an ideal space for limiting the displacement of the storage device towards the passenger compartment of the vehicle and absorbing the effects of the impact between the bottom of the storage device and the structural elements extending facing and/or between the knees of a passenger of the vehicle and the frontage of the device the case of an impact against the motor vehicle. This absorption is accomplished without deformation of the whole of the storage device.

According to other features of the storage device:
- the separable attachment device is arranged so as to allow separation of the front portion from the rear portion when the external force is applied along a direction from the front portion to the storage space and for maintaining the front portion firmly attached to the rear portion when the external force is applied along a direction from the storage space to the front portion.
- the rear portion comprises two side walls extending on either side of the storage space, said side walls bearing the separable device for attaching the front portion onto the rear portion;
- the attachment device comprises a snap-on fastening element protruding from each sidewall in the storage space and an edge extending from the end of each side wall towards the front portion, the snap-on fastening element and the edge of the side wall being arranged so as to retain between them one of the side edges of the front portion;
- the attachment device is formed by at least one frangible member;
- the attachment device comprises a film hinge connecting the bottom line of the rear portion to the front portion, said hinge being laid out so as to break under the effect of the external force greater than a predetermined threshold;
- the attachment device is formed by at least one frictional engagement member;
- the front portion is formed by a substantially planar wall;
- the front portion is formed by a plurality of walls defining a portion of the storage space between them, the rear portion defining another portion of the storage space.

The invention also relates to a vehicle dashboard, comprising a storage device as described above, said dashboard comprising a frontage and an internal portion positioned facing structural elements of the vehicle, the storage device being arranged so that the front portion extends on the side of the frontage and the rear portion extends on the side of the internal portion.

BRIEF DESCRIPTION OF THE DRAWINGS

Other aspects and advantages of the invention will become apparent upon reading the description which follows, given as an example and made with reference to the appended drawings, wherein.

DESCRIPTION OF THE ILLUSTRATED EMBODIMENTS

In the description, the terms "front" and "rear" are defined relatively to the usual front-rear direction of an assembled motor vehicle. The term of "side" is defined according to the width of the motor vehicle.

Figure 1:
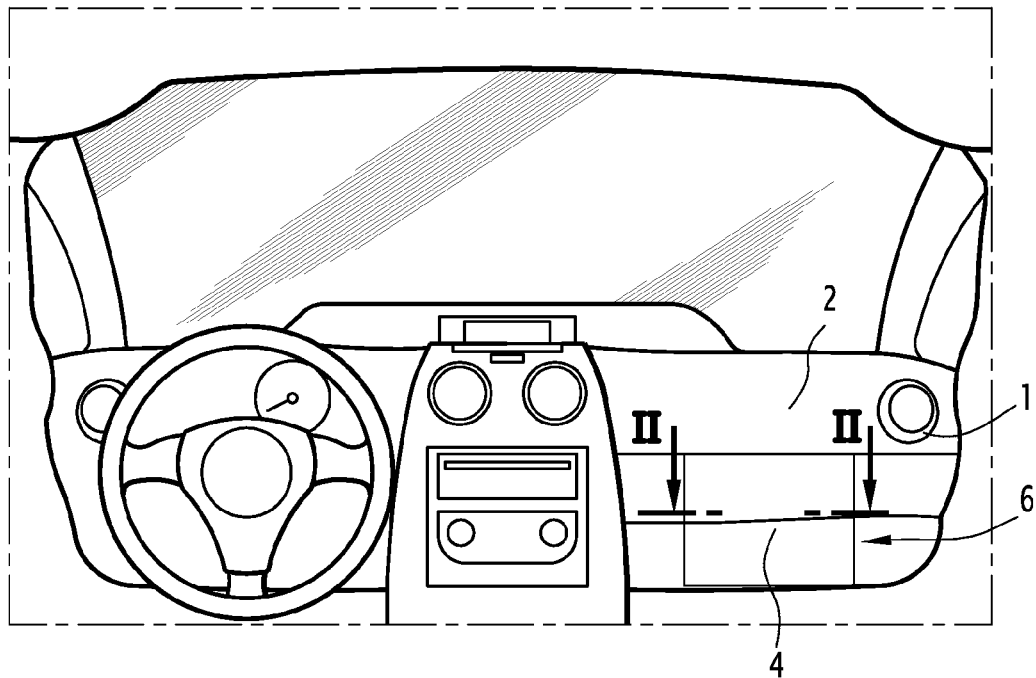
FIG. 1 is a schematic front illustration of the passenger compartment of a motor vehicle, showing the frontage of a storage device.

With reference to FIG. 1, a dashboard of a motor vehicle 1 is described, comprising a frontage 2, turned towards the passenger compartment of the motor vehicle, integrating the frontage wall 4 of a storage device 6. The storage device 6 is for example a glove box extending on the side of the front passenger of the motor vehicle, facing the knees of the latter. By integrated is meant that the frontage wall 4 extends in the continuity of the frontage 2 of the dashboard.

The frontage wall 4 conceals a storage space 8 extending inside the dashboard 1. The storage space 8 is defined by a body 10 of the storage device 6 and is intended to receive objects to be stored in the motor vehicle. In a known way, the storage space 8 is accessible from the passenger compartment of the motor vehicle either by providing a mobile frontage wall 4 relatively to the body 10 of the device 6, or by making the whole body 10 mobile with respect to the dashboard 1.

The body 10 of the storage device comprises a rear portion 12, to which the frontage wall 4 belongs, and a front portion 14 attached to each other by a separable attachment device 16. More particularly, the rear portion 12 and the front portion 14 are made in two parts distinct from each other. The rear portion 12 and the front portion 14 define together the storage space 8 when they are attached to each other. The storage space 8 may have all the forms which may be contemplated for this type of application by adapting the shape of the rear portion 12 and of the front portion 14. The front portion 14 defines the bottom of the storage device 6 and is for example positioned facing structural elements of the motor vehicle, concealed by the dashboard 1.

Figure 2:
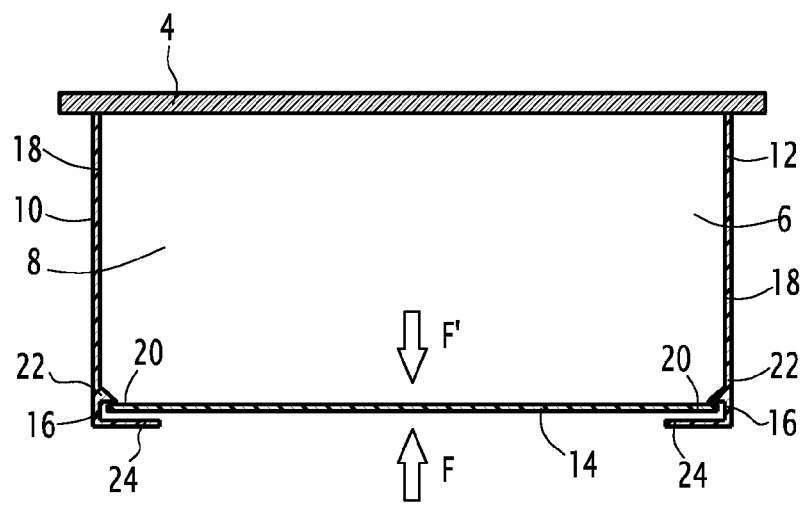
FIG. 2 is a schematic sectional illustration along the axis II-II of FIG. 1, according to a first embodiment of the storage device.

As an example, according the embodiment illustrated in FIG. 2, the storage space 8 has a substantially parallelepipedal shape, the front portion 14 forming one face of this parallelepiped by being made in the form of a substantially planar wall. The remainder of the parallelepiped is formed by the rear portion 12 and notably comprises two side walls 18 forming two sides of the parallelepiped, extending on either side of the storage space 8, and which connect the frontage wall 4 to the substantially planar wall formed by the front portion 14.

According to another example illustrated in FIG. 3, the storage space 8 has a different shape because of the particular geometry of the front portion 14, the rear portion 12 being substantially identical with the one described with reference to FIG. 2. According to this embodiment, the storage space 8 is enlarged since the front portion 14 is formed by a plurality of walls 20 which define an additional space with a substantially parallellepipidal shape, which is added to the space with a substantially parallellipipidal shape defined by the walls of the rear portion 12.

The shapes of the front 14 and rear 12 portions are adapted depending on the available space between the frontage 4 and the structural elements and on the position of the structural elements with respect to the front portion 14 of the storage device 6.

The shapes described above are by no means limiting and have only been illustrated as an example.

In the illustrated embodiments, the front portion 14 is attached to the rear portion through its side edges 20 which cooperate with the separable attachment device 16, provided on the side walls of the rear portion 12.

Figure 3:
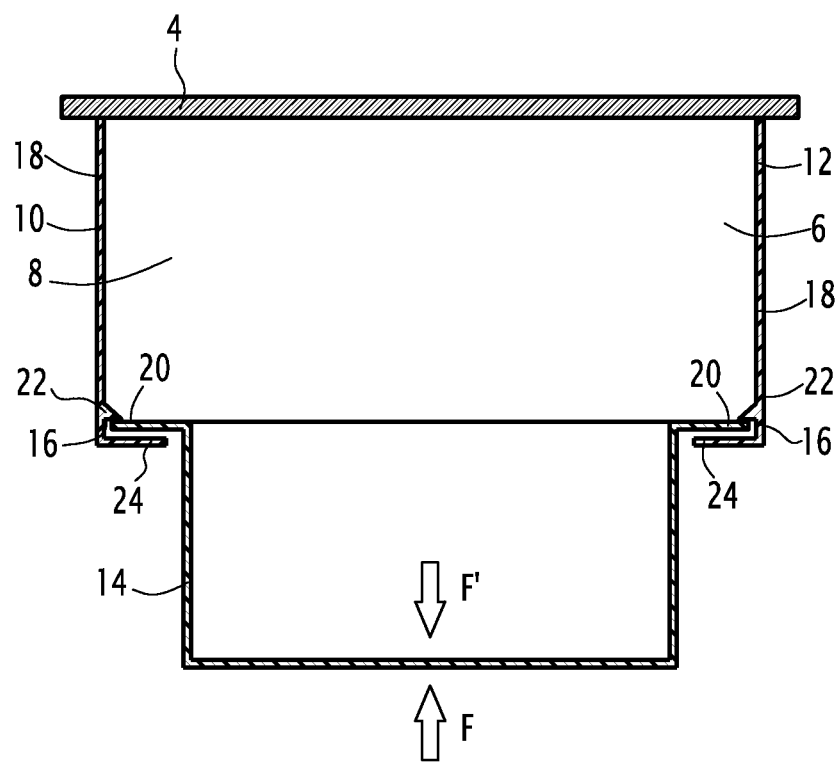
FIG. 3 is a schematic sectional illustration along the axis II-II of FIG. 1, according to a second embodiment of the storage device.

According to the embodiment illustrated in FIGS. 2 and 3, the attachment device 16 is formed by a snap-on fastening element 22 provided on each side wall 18 and by an edge 24 extending from the end of each side wall 18 towards the front portion 14 facing the snap-on fastening element 22. Each side wall 20 of the front portion 14 is retained between a snap-on fastening element 22 and an edge 24 extending facing each other, as illustrated in FIGS. 2 and 3.

The snap-on fastening element 22 is formed by a snap-on fastening tab protruding from a side wall 18 in the storage space 8, arranged so as to forcibly let through the side edge 20 towards the edge 24, in order to attach the front portion 14 between the snap-on fastening element 22 and said edge 24, and for allowing clearing of the side edge 20 when a certain force is applied against the front portion 14, as this will be described subsequently. The edge 24 has sufficient rigidity for retaining the supported front portion 14, even when the storage space 8 is filled with objects to be stored.

Thus, the attachment device 16 is arranged so as to allow separation of the front portion 14 from the rear portion 12 when an external force greater than a predetermined threshold is applied on the front portion 12 along a direction from the front to the rear, as illustrated by the arrow F of FIGS. 2 and 3 and for maintaining the front portion firmly attached to the rear portion when the external force is applied according to a direction from the rear to the front as illustrated by the arrow F' of FIGS. 2 and 3.

The storage device 6 is therefore arranged so that the front portion 14 separates from the rear portion 12 and penetrates into the storage space 8 under the effect of an external force greater than a predetermined threshold, applied from the front towards the rear. Such a force is applied when the structural elements of the motor vehicle positioned facing the front portion 14 are pushed against the front portion 14 under the effect of a frontal impact against the vehicle for example. Such a force may also be applied when the knees of an occupant violently hit the storage device 6 so that the front portion 14 will hit the structural elements positioned facing the latter. Thus, in the case of a violent impact against the storage device 6, a limitation of the intrusion of structural elements or of the storage device into the motor vehicle passenger compartment is ensured, this intrusion being absorbed by penetration of the front portion 14 into the storage space. It is also ensured that the knees of the occupant of the motor vehicle do not hit the structural elements facing the storage device 6 even in the case of a violent impact against the storage device. According to an embodiment, the predetermined threshold beyond which the front portion 14 separates from the rear portion 12 corresponds to a force substantially comprised between 250 N and 750 N and is adapted depending on the force level transmitted to the knees of the occupant of the vehicle. This threshold may be adjusted by selecting the characteristics of the snap-on fastening tabs forming the snap-on fastening elements 22.

However, it will be noted that the storage device is arranged so that the front portion 14 does not separate from the rear portion 12 when the force is applied along the direction from the rear to the front. It is thus ensured that the storage device 6 has sufficient rigidity and resistance for supporting the objects positioned in the storage space 8.

The storage device 6 described above is particularly simple to make and assemble in the motor vehicle. The attachment of the front portion 14 on the rear portion 12 is simply accomplished by introducing the front portion 14 between the side walls 18 through the storage space 8 and by pushing until the side edges 20 of the front portion 14 cooperate with the snap-on fastening element 22 and are bearing against the edges 24 of the front portion. The mounting of the storage device 6 is therefore particularly simple and only consists in assembling by snap-on fastening the front portion onto the rear portion. Further, in a case of an impact, the front portion 14 simply separates from the rear portion 12 without destroying the storage device 6. Thus, the storage device does not necessarily have to be replaced after the impact. The front portion 14 may possibly be deformed against the structural elements under the effect of the impact, in which case only one portion of the storage device 6 has to be replaced after the impact. It will be noted that with the snap-on fastening elements 22, the separation between the front portion 14 and the rear portion 12 in the case of an impact is achieved in a reliable way, without any risk of this separation not occurring as this might be the case with a storage device made as a single piece with weakened portions for example. Further, the triggering of this separation is accomplished immediately and without any delay as soon as the impact occurs, which limits the risks of injury to the occupant of the vehicle.

Figure 4:
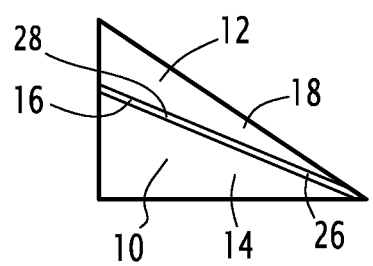
FIG. 4 is a partial illustration of a corner of a storage device according to another embodiment of the invention.

The separable attachment device 16 is not limited to the snap-on fastening element 22 and to the edges 24 described above. Thus, as illustrated in FIG. 4, the attachment device 16 also comprises a film hinge 26 connecting the bottom line 28 of the rear portion 12 to the front portion 14. This hinge forms a frangible member, i.e. designed to break under the effect of the external force greater than a predetermined threshold. Other types of frangible members may also be provided, such as screws laid out so as to break under the effect of a force greater than a predetermined threshold. According to an embodiment, the snap-on fastening elements 22 are made so as to be frangible in the direction from the front to the rear in order to further accelerate the separation of the portions of the storage device upon an impact.

The separable attachment device 16 may however be made otherwise than by snap-on fastening members or frangible members, for example, by frictional engagement members. However, it will be noted that when the attachment device is made by snap-on fastening members, mounting is simplified and separation in the case of an impact is guaranteed.

In the storage device 8 described above, the front portion 14 is arranged so as to be separated from the rear portion 12 and for penetrating into the storage space 8 under the effect of a force greater than a predetermined threshold. However, it is understood that the storage device may also be arranged so that it is the rear portion 12 which separates from the front portion 14 and which penetrates into the storage space 8, for example in order to protect the knees of an occupant of the vehicle which will hit the storage device 6.

The storage device 6 has been described in connection with a storage device provided in a dashboard on a motor vehicle. However, it is understood that this storage device may be adapted for other types of vehicles.

The invention claimed is:

1. A vehicle storage device comprising at least one front portion and one rear portion defining between them a storage space further delimited by two side walls, wherein the front portion and the rear portion are attached to each other by a separable attachment device, said attachment device being arranged so as to allow separation of said front portion from said rear portion under the effect of an external force greater than a predetermined threshold, so that the front portion or the rear portion is detached from the other portion and penetrates into the storage space under the effect of said external force, without deforming or destroying the storage device.

2. The storage device according to claim 1, wherein the separable attachment device is arranged so as to allow separation of the front portion from the rear portion when the external force is applied along a direction from the front portion towards the storage space and for maintaining the front portion firmly attached to the rear portion when the external force is applied along a direction from the storage space to the front portion.

3. The storage device according to claim 1, wherein the rear portion comprises two side walls extending on either side of the storage space, said side walls bearing the separable device for attaching the front portion on the rear portion.

4. The storage device according to claim 3, wherein the attachment device comprises a snap-on fastening element protruding from each side wall in the storage space and an edge extending from the end of each side wall towards the front portion, the snap-on fastening element and the edge of a side wall being arranged so as to retain between them one of the side edges of the front portion.

5. The storage device according to claim 3 wherein the attachment device is formed by at least one frangible member.

6. The storage device according to claim 3, wherein the attachment device comprises a film hinge connecting the bottom line of the rear portion to the front portion, said hinge being arranged so as to break under the effect of the external force greater than a predetermined threshold.

7. The storage device according to claim 3, wherein the attachment device is formed by at least one frictional engagement member.

8. The storage device according to claim 1, wherein the front portion is formed by a substantially planar wall.

9. The storage device according to claim 1, wherein the front portion is formed by a plurality of walls defining a portion of the storage space between them, the rear portion defining another portion of the storage space.

10. A vehicle dashboard comprising a storage device according to claim 1, said dashboard comprising a frontage and an internal portion positioned facing structural elements of the motor vehicle, the storage device being arranged so that its rear portion extends on the side of the frontage and the front portion extends on the side of the internal portion, facing the structural elements of the vehicle.

11. The storage device according to claim 1, wherein the separable attachment device is located within the storage space.

12. The storage device according to claim 1, wherein the attachment device is disengaged from the front portion once the external force exceeds the predetermined threshold.

13. The storage device according to claim 1, wherein the front portion or rear portion can penetrate into the storage space along the entire length of the side walls once the front portion or the rear portion is detached from the other portion.

14. A vehicle storage device comprising a first portion and a second portion, one of said first and second portions comprising a front portion of the storage device and the other of the first and second portions comprising a rear portion of the storage device, wherein at least said first portion has a pair of side walls and said second portion has an edge positioned adjacent each side wall of the first portion, wherein said first and second portions at least partially define between them a storage space, said first and second portions being attached to each other by an attachment device located on each of the two side walls of the first portion, wherein each said attachment device retains one of the edges of the second portion between the attachment device and an edge of the first portion;

wherein said attachment device is arranged so as to allow separation of said first and second portions under the effect of an external force greater than a predetermined threshold, with at least one of said first and second portions disengaging said attachment device once the first and second portions disengage each other due to the external force.

* * * * *